United States Patent
Liberant

(10) Patent No.: US 10,282,183 B2
(45) Date of Patent: *May 7, 2019

(54) METHODS, APPARATUSES AND COMPUTER PROGRAM PRODUCTS FOR IMPROVING PRODUCTIVITY FOR BUILDING APPLICATIONS

(71) Applicant: United Parcel Service of America, Inc., Atlanta, GA (US)

(72) Inventor: Michael Liberant, Upper Saddle River, NJ (US)

(73) Assignee: United Parcel Service of America, Inc., Atlanta, GA (US)

(*) Notice: Subject to any disclaimer, the term of this patent is extended or adjusted under 35 U.S.C. 154(b) by 27 days.

This patent is subject to a terminal disclaimer.

(21) Appl. No.: 15/387,939

(22) Filed: Dec. 22, 2016

(65) Prior Publication Data

US 2017/0147309 A1  May 25, 2017

Related U.S. Application Data

(63) Continuation of application No. 13/835,601, filed on Mar. 15, 2013, now Pat. No. 9,588,741.

(51) Int. Cl.
   *G06F 9/44* (2018.01)
   *G06F 8/54* (2018.01)
   *G06F 8/30* (2018.01)

(52) U.S. Cl.
   CPC ............... *G06F 8/54* (2013.01); *G06F 8/315* (2013.01)

(58) Field of Classification Search
   CPC ............... G06F 8/42; G06F 8/48; G06F 8/315
   See application file for complete search history.

(56) References Cited

U.S. PATENT DOCUMENTS

| | | | |
|---|---|---|---|
| 5,956,513 A | 9/1999 | McLain, Jr. | |
| 8,572,679 B1 | 10/2013 | Wang et al. | |
| 2006/0059464 A1 | 3/2006 | Jameson | |
| 2009/0113396 A1 | 4/2009 | Rosen et al. | |
| 2010/0251225 A1 | 9/2010 | Nakayama | |
| 2013/0104112 A1 | 4/2013 | Novillo et al. | |

(Continued)

OTHER PUBLICATIONS

Winder, "The Evils of Unity Builds", Dec. 15, 2009, pp. 1-9 (Year: 2009).*

(Continued)

*Primary Examiner* — Duy Khuong T Nguyen
(74) *Attorney, Agent, or Firm* — Shook, Hardy & Bacon L.L.P.

(57) ABSTRACT

An apparatus is provided for building an application. The apparatus may include at least one memory and at least one processor configured to generate a build of an application in a C Object-Oriented Programming Language. The processor is also configured to generate a unity file including a plurality of source files having references to one or more header files. At least two of the source files include references to a same header file. The processor is also configured to compile the unity file including the plurality of source files to obtain an object file. The processor is also configured to link the object file to generate an executable of the application. Corresponding computer program products and methods are also provided.

16 Claims, 6 Drawing Sheets

(56) References Cited

U.S. PATENT DOCUMENTS

2014/0282438 A1    9/2014  Liberant

OTHER PUBLICATIONS

Niwinski, "Speeding up build times with Master/Unity/Bulk Builds", Oct. 6, 2016, pp. 1-4 (Year: 2016).*
Heindl, Christoph, "Reducing Compilation Time: Unity Builds," Dec. 10, 2009, 6 pages, retreived from <http://cheind.wordpress.com/2009/12/10/reducing-compilation-time-unity-builds/> on Jul. 11, 2013.
Holgate, Len, "Speeding Up C++ Builds—Rambling Comments", Mar. 1, 2010, 4 pages, retrieved from <http://www.lenholgate.com/blog/2010/03/speeding-up-c-builds.html> on Jul. 11, 2013.
Reeves, O.J., "The Magic of Unity Builds-OJ's—Rants," Dec. 10, 2007, 6 pages, retrieved from <http://buffered.io/2007/12/10/the-magic-of-unity-builds/> on Jul. 11, 2013.
Stack Overflow Community, "Compile multiple C source files into a unique object file", Aug. 12, 2013, Stack Overflow, pp. 1-3.
United States Patent and Trademark Office, Office Action for U.S. Appl. No. 13/835,601, dated Feb. 20, 2016, 34 pages, U.S.A.
United States Patent and Trademark Office, Office Action for U.S. Appl. No. 13/835,601, dated Jun. 4, 2015, 44 pages, U.S.A.
United States Patent and Trademark Office, Office Action for U.S. Appl. No. 13/835,601, dated Nov. 19, 2015, 41 pages, U.S.A.
United States Patent and Trademark Office, Office Action for U.S. Appl. No. 13/835,601, dated May 11, 2016, 44 pages, U.S.A.
United States Patent and Trademar Office, Notice of Allowance for U.S. Appl. No. 13/835,601, dated Oct. 25, 2016, 15 pages, U.S.A.

* cited by examiner

METHODS, APPARATUSES AND COMPUTER PROGRAM PRODUCTS FOR IMPROVING PRODUCTIVITY FOR BUILDING APPLICATIONS

CROSS-REFERENCE TO RELATED APPLICATIONS

This application is a continuation of U.S. application Ser. No. 13/835,601, filed Mar. 15, 2013, the contents of which are hereby incorporated herein in its entirety by reference.

TECHNOLOGICAL FIELD

Exemplary embodiments of the invention relate generally to methods, apparatuses and computer program products for improving software development and more particularly relates to a mechanism of improving productivity during a software development build cycle for applications.

BACKGROUND

Currently, using Microsoft™ Visual Studio to build large C++ projects is a processor, memory and hard drive intensive activity which renders most other functions of a computer (e.g., personal computer (PC)) useless. Developers' productivity is significantly reduced during a typical software development build cycle for large C++ projects. To circumvent the long build times, at present, developers tend to delay the frequency of builds thereby reducing the frequency of unit testing and potentially increasing the overall defect count. Moreover, the increased build times may delay time-to-market of new initiatives.

A project build time is typically divided between compiling source files and linking object files. At present, compile and link time for C++ projects may take a very long time, and that time tends to grow with the size and complexity of the project. For example, currently, an executable build time for an application may be more than 40 minutes (e.g., 43 minutes). Additionally, idle time during a build phase may be an average of 43 minutes per day or 3.5 hours per week for each developer (e.g., software developer). In this regard, developers may attempt to adapt by compiling less often which may lead to less unit testing and more defects. In some instances, significant loss of productivity due to long build times may cause decreased time-to-market of new initiatives and increased cost of implementing new initiatives.

At present, most of the compile time, associated with a build time, is spent on reading and parsing C++ header files. The same header files are often referenced by multiple source files thereby causing those files to be read and parsed over and over again, which may be inefficient. Each source file is then compiled into an object file which is written to disk. Additionally, each object file may be read, parsed and linked into an executable or library file. The multiple build stages which require multiple disk reads and writes may cause large C++ project build times to exceed 40 minutes on a computer which may be inefficient.

In view of the foregoing drawbacks, it may be beneficial to provide an efficient and reliable mechanism for improving the productivity of building applications.

BRIEF SUMMARY

A method, apparatus and computer program product are therefore provided for improving productivity and reducing the build times of applications. In this regard, the exemplary embodiments may reduce application build times such as, for example, C Object-Oriented Programming Language (C++) application build times by utilizing a technique referred to herein as unity build and automating generation of unity source files via a unity build module. The unity build technique may utilize the concept of compiling all source files into one or more object files by referencing (e.g., via a "#include" designation) all source files in one or more uniting source files while excluding all other source files from a project. This may result in a significant reduction of disk reads since all header files may be visible by a compiler. Also, the number of disk writes may be significantly reduced since the total number of object files may be one or a few (e.g., 2-10 object files for a large project). Additionally, link time may be significantly reduced since the number of object files in need of being read and parsed is reduced (e.g., one or a few (e.g., 2-10 object files)). In this regard, the exemplary embodiments may improve compile and link times by reducing reading and parsing of header files, reducing the writing of object files and reducing the reading and parsing of object files for linking.

The exemplary embodiments may also automate the process of generating the uniting source files. The exemplary embodiments may also enable developers to switch to a unity configuration, generate the uniting source files and add the uniting source files to a project, while excluding all other source files (e.g., individual source files) from the project and starting the build process with the click of a button, menu item or the like. When the build is complete, the configuration may be automatically switched to the previously selected configuration making the entire unity build process completely seamless to a user (e.g., a developer). The exemplary embodiments may also provide a user interface that allows saving per-project settings such as, for example, how many source files should be included in each unity file(s), what to add to each unity file(s) and which files to exclude from the unity file(s). By utilizing the exemplary embodiments, a reduction in build times of 75% to 90% may be achieved.

In one example embodiment, a method for building an application is provided. The method may include generating a build of an application in a C Object-Oriented Programming Language. The method may further include generating a unity file including a plurality of source files which includes references to one or more header files. At least two of the source files may include references to a same header file. The method may further include compiling the unity file including the plurality of source files to obtain an object file. The method may further include linking the object file to generate an executable of the application.

In another example embodiment, an apparatus for building an application is provided. The apparatus may include a processor and a memory including computer program code. The memory and computer program code are configured to, with the processor, cause the apparatus to at least perform operations including generating a build of an application in a C Object-Oriented Programming Language. The memory and computer program code are also configured to, with the processor, cause the apparatus to generate a unity file including a plurality of source files which includes references to one or more header files. At least two of the source files may include references to a same header file. The memory and computer program code are also configured to, with the processor, cause the apparatus to compile the unity file including the plurality of source files to obtain an object file. The memory and computer program code are also configured to, with the processor, cause the apparatus to link the object file to generate an executable of the application.

In another example embodiment, a computer program product for building an application is provided. The computer program product includes at least one computer-readable storage medium having computer-executable program code instructions stored therein. The computer-executable program code instructions may include program code instructions configured to generate a build of an application in a C Object-Oriented Programming Language. The computer program product may further include program code instructions configured to generate a unity file including a plurality of source files which includes references to one or more header files. At least two of the source files may include references to a same header file. The computer program product may further include program code instructions configured to compile the unity file including the plurality of source files to obtain an object file. The computer program product may further include program code instructions configured to link the object file to generate an executable of the application.

Embodiments of the invention may provide a method, apparatus and computer program product for enabling an efficient and reliable mechanism for reducing build times of applications such as, for example, C++ applications. As a result, a developer's productivity may increase resulting in more time to complete initiatives with fewer defects.

BRIEF DESCRIPTION OF THE SEVERAL VIEWS OF THE DRAWINGS

Figure 1:
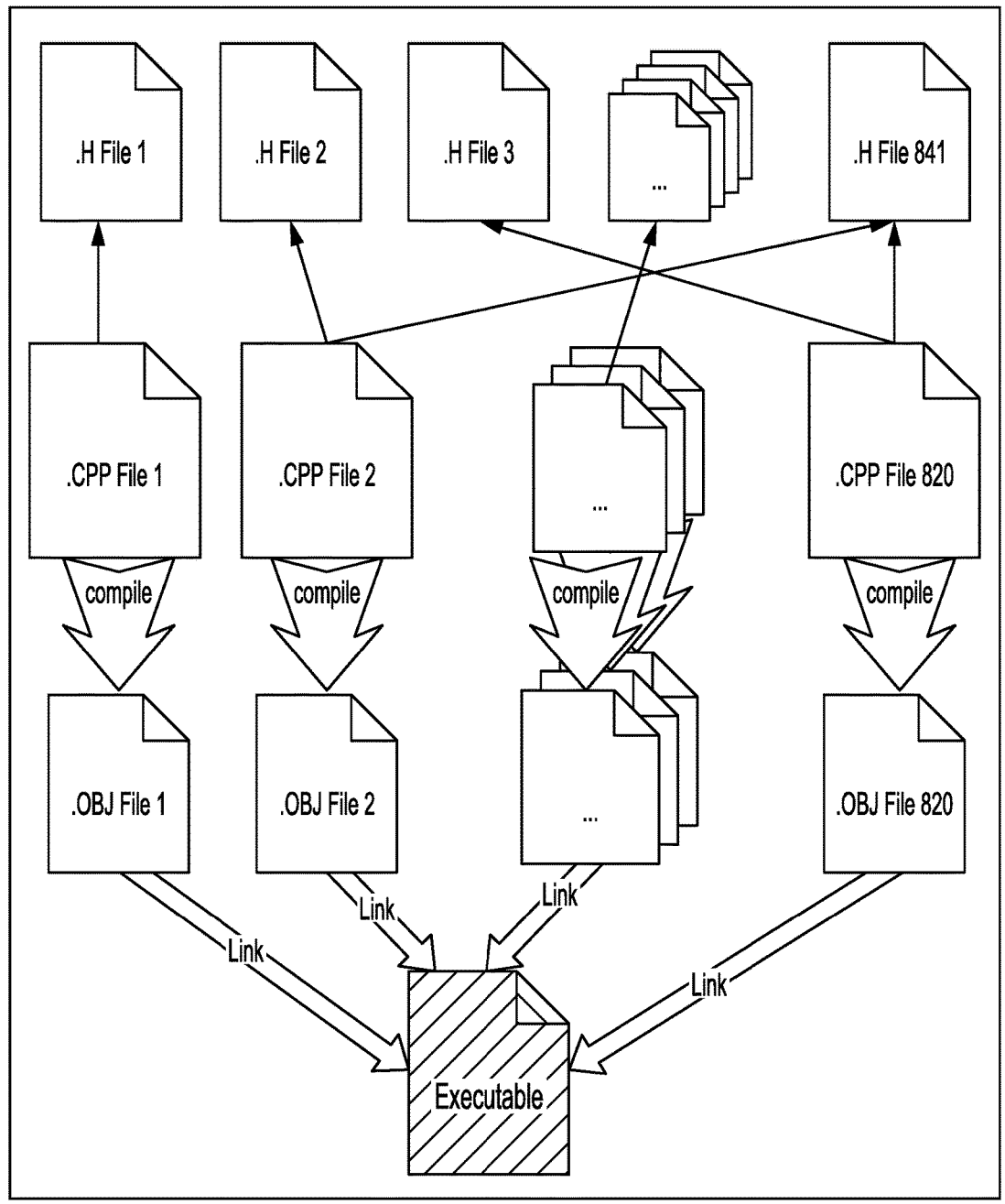
Figure 2:
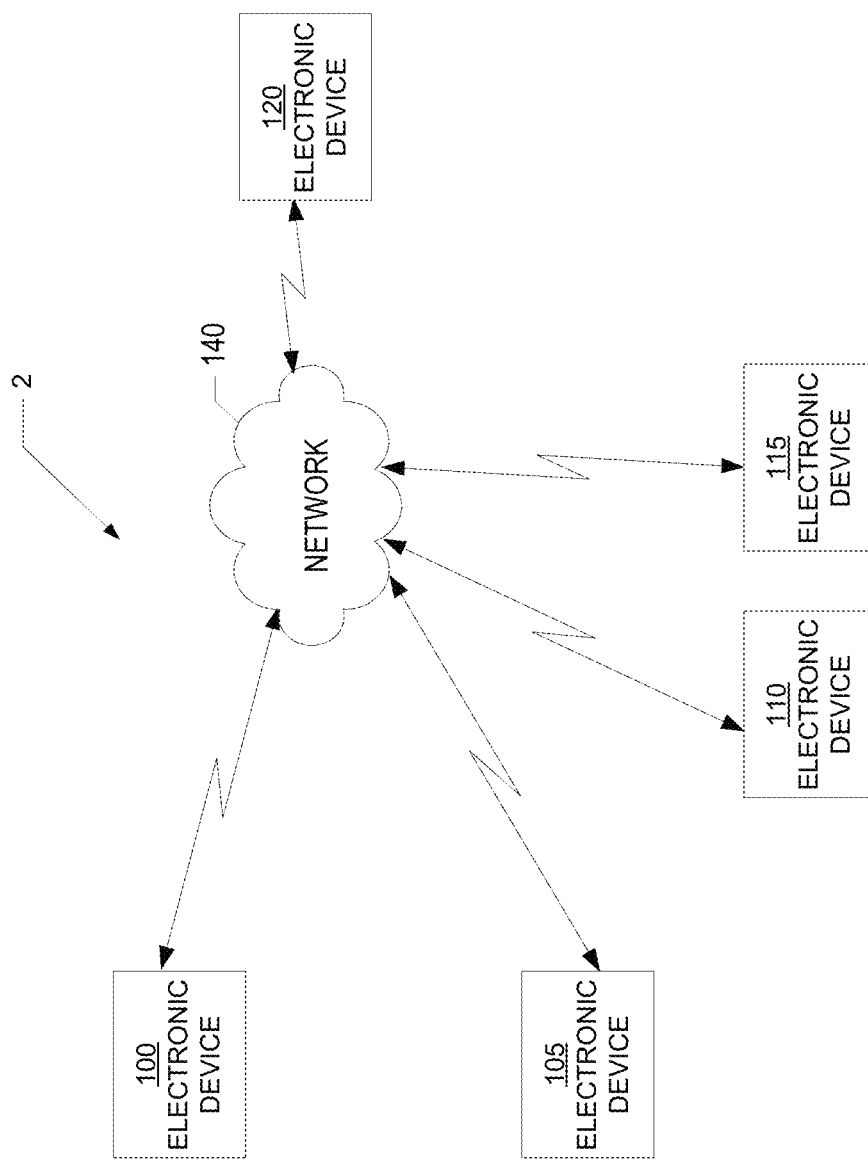
Figure 3:
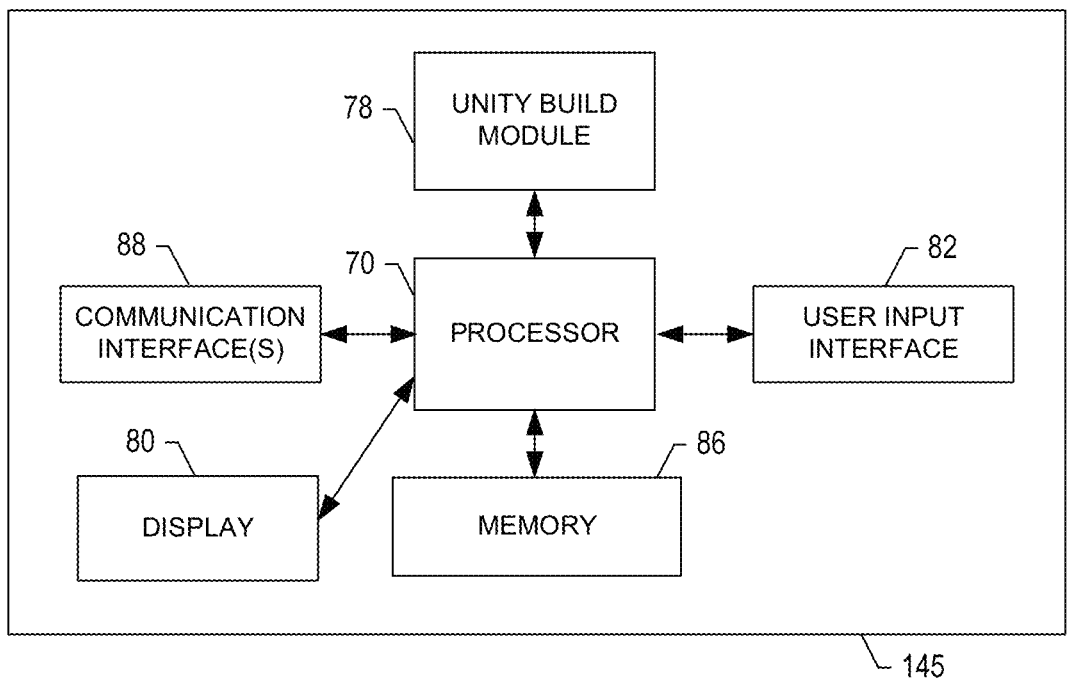
Figure 4:
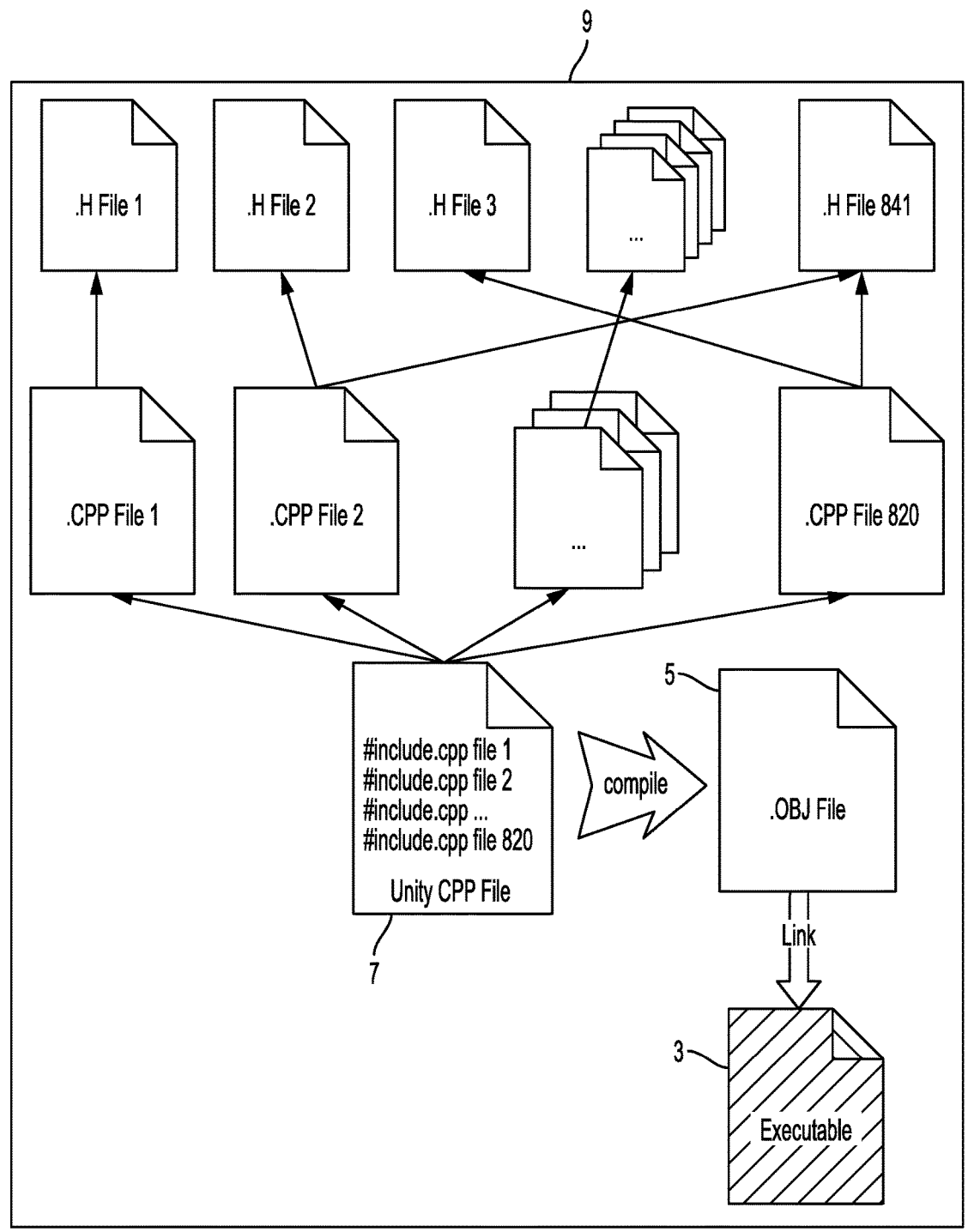
Figure 5:
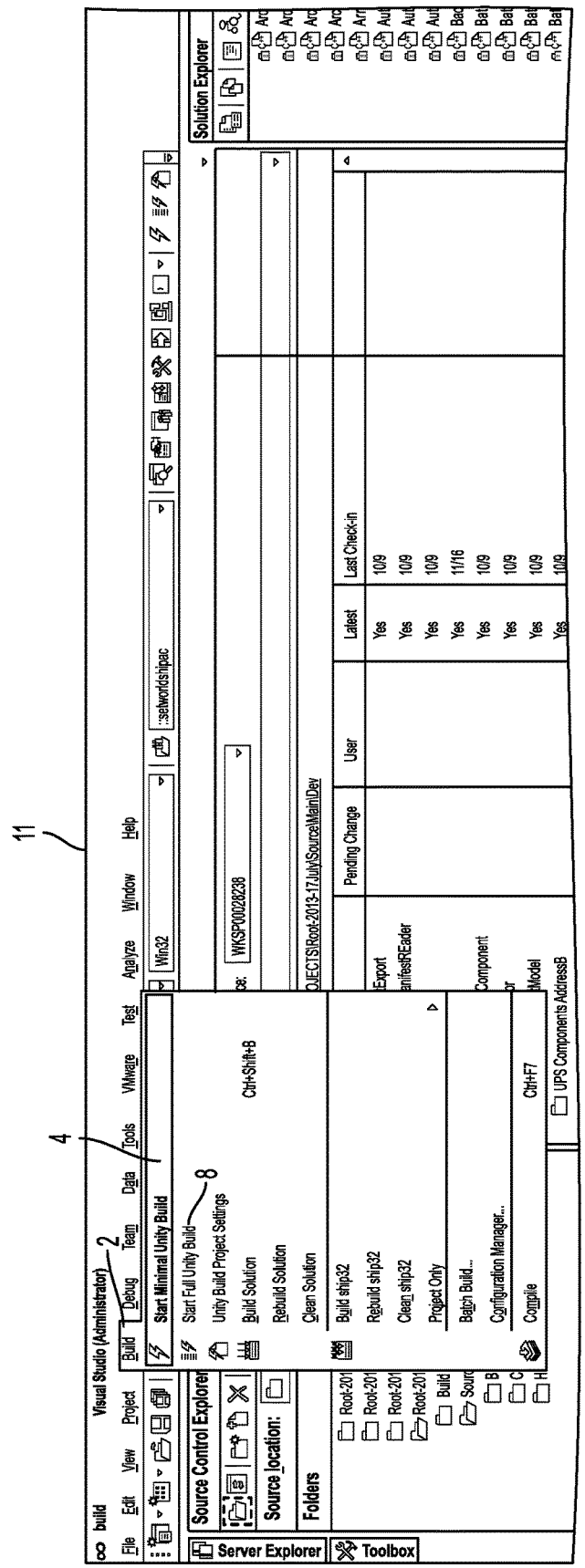
Figure 6:
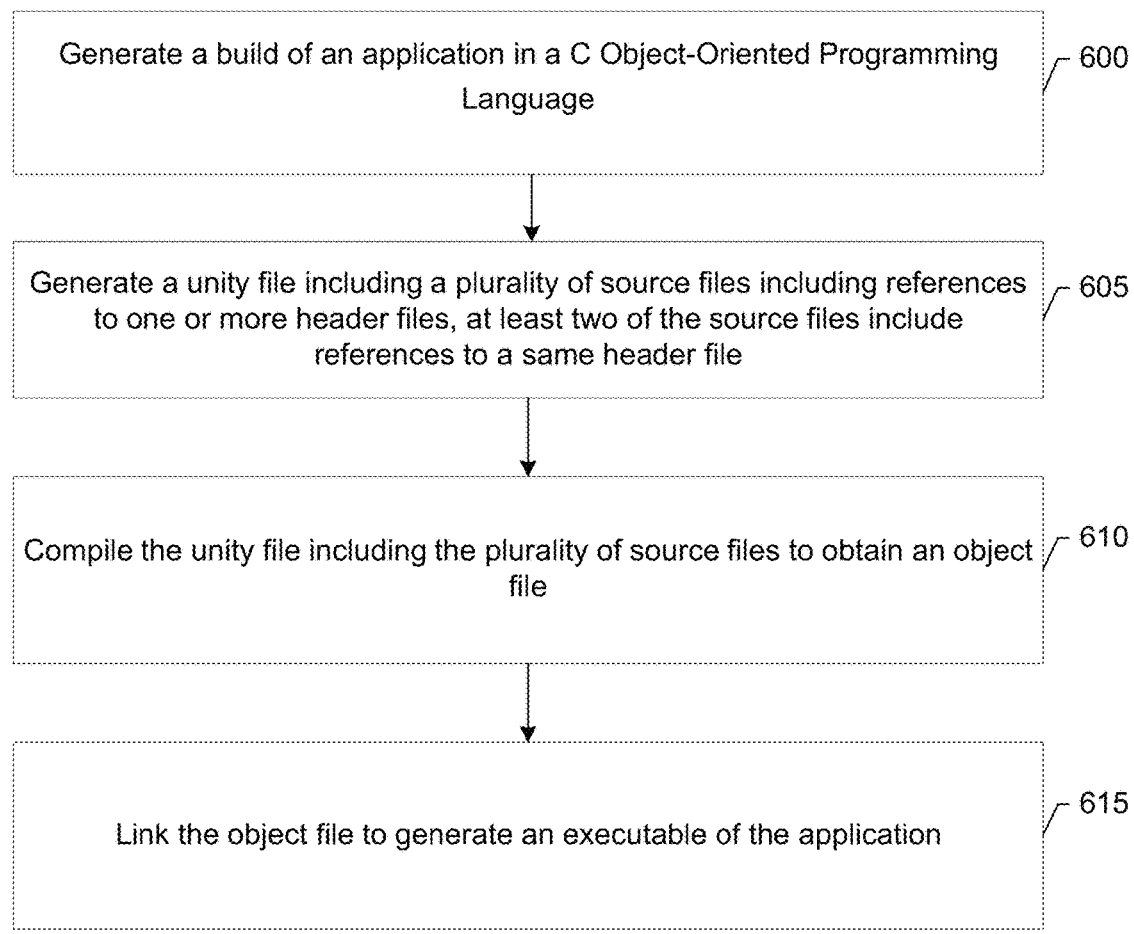

Having thus described the invention in general terms, reference will now be made to the accompanying drawings, which are not necessarily drawn to scale, and wherein:

FIG. 1 is a diagram illustrating an application build;

FIG. 2 is a schematic block diagram of a system according to an exemplary embodiment of the invention;

FIG. 3 is a schematic block diagram of a communication device according to an exemplary embodiment of the invention;

FIG. 4 is a diagram illustrating an application build according to an exemplary embodiment of the invention;

FIG. 5 is a diagram illustrating a user interface according to an exemplary embodiment of the invention; and FIG. 6 illustrates a flowchart of an exemplary method according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, an "application build", "build of an application", "software build", "build of software", "project", "project build" and similar terms may be used interchangeably to refer to development of computer software (e.g., computer code) into an executable application.

Referring now to FIG. 1, a diagram illustrating a current approach to building an application is provided. The current approach to building an application such as, for example, a C++ project build is divided between compiling source files and linking object files. The compile and link time for C++ projects may take a very long time, and this time typically increases with the size and complexity of the project. Most of the compile time is spent on reading and parsing C++ header files. In this regard, the same header files are often referenced by multiple source files thereby causing the files to be repeatedly read and parsed which is time consuming and inefficient. Each source file(s) may then be compiled into an object file(s) which is written to disk. In addition, each object file may be read, parsed and linked into an executable or library file. The multiple build stages which may require multiple disk reads and writes may cause a C++ project (e.g., a large C++ project) build to take an inordinate amount of time for completion. As such, at present, multiple build stages requiring disk reads and writes for C++ project builds may be inefficient and may unnecessarily consume processing and memory resources.

In the example of FIG. 1, there are 820 C plus plus (cpp) files that reference one or more header files (also referred to herein as H File(s)). For instance, CPP File 2 references H File 2 and H File 841 whereas CPP File 820 references H File 3 and H File 841. The CPP File 1 references H File 1.

During the build of the C++ project (e.g., a C++ application) of FIG. 1, each of the CPP Files may be compiled, by a computing device, one at a time. In this regard, each of the H Files that the CPP Files reference may be read and parsed by the computing device. For example, in an instance in which the CPP File 1 is compiled, by the computing device, the H File 1 is read and parsed. As another example, in an instance in which the CPP File 2 is compiled, by the computing device, the H File 2 and H File 841 are read and parsed by the computing device. Moreover, in an instance in which the CPP File 820 is compiled, the H File 841 and H File 3 may be read and parsed.

Since both the CPP File 820 and the CPP File 2 reference H File 841, the H File 841 is read and parsed twice by the computing device which is time consuming and inefficient. In a subsequent step of the build process, corresponding object files are created in response to compiling the CPP Files. For instance, in response to compiling CPP File 1, the object file 1 (e.g., OBJ File 1) is created by the computing device and in response to compiling CPP File 2, the object file 2 (e.g., OBJ File 2) is created by the computing device. Additionally, in response to compiling CPP File 820, the object file 820 (e.g., OBJ File 820) is created by the computing device. The object files 1, 2 and 820 (e.g., OBJ File 1, OBJ File 2, OBJ File 820 respectively) include references to respective CPP Files as well as corresponding header files. For instance, the object file 2 has a reference(s) to CPP File 2 and H File 2 and H File 841. Object file 820 has a reference(s) to CPP File 820 and H File 3 and H File 841. Object file 1 has a reference(s) to CPP File 1 and header file H File 1.

Subsequently, the computing device may link each of the object files (e.g., OBJ File 1, OBJ File 2, OBJ File 820) into a link library such as, for example, a dynamic link library (DLL) or an executable file. For instance, at link time the computing device may read and parse all the object files and link the object files (e.g., physical files) into an executable file. Reading and parsing multiple object files is time consuming and may cause inefficient consumption of computing resources such as, for example, processing and memory capacity. In this regard, for example, usage of the current approach may take more than 40 minutes (e.g., 43 minutes) to build an application such as for example, a C++ application containing over 800 source files (e.g., an executable). As such, at present, the existing approach to generate application builds may cause reading and parsing of files more than once which is time consuming an inefficient.

General System Architecture

Reference is now made to FIG. 2, which is a block diagram of a system according to exemplary embodiments. As shown in FIG. 2, the system 2 may include one or more communication devices 100, 105, 110, 115, and 120 (e.g., personal computers, laptops, workstations, servers, personal digital assistants, smart devices and the like, etc.) which may communicate with each other over a network 140, such as a wired local area network (LAN) or a wireless local area network (WLAN), a metropolitan network (MAN) and/or a wide area network (WAN) (e.g., the Internet). In this regard, the electronic devices 100, 105, 110, 115 and 120 are capable of receiving data from and transmitting data via network 140.

In one exemplary embodiment, the electronic devices 100, 105, 110, 115, and 120 may be utilized by developers and any other suitable users to build applications (e.g., C++ applications).

It should be pointed out that although FIG. 2 shows five electronic devices 100, 105, 110, 115, and 120 any suitable number of electronic devices 100, 105, 110, 115, and 120 may be part of the system of FIG. 2 without departing from the spirit and scope of the invention.

Communication Device

FIG. 3 illustrates a block diagram of a communication device according to an exemplary embodiment of the invention. The communication device 145 is capable of operating as any of electronic devices 100, 105, 110, 115 and 120. In this regard, the electronic devices 100, 105, 110, 115 and 120 may comprise the elements of the communication device of FIG. 3.

The communication device 145 includes various means for performing one or more functions in accordance with exemplary embodiments of the invention, including those more particularly shown and described herein. It should be understood, however, that one or more of the communication devices may include alternative means for performing one or more like functions, without departing from the spirit and scope of the invention. More particularly, for example, as shown in FIG. 3, the communication device 145 may include a processor 70 connected to a memory 86. The memory may comprise volatile and/or non-volatile memory, and typically stores content (e.g., media content), data, information or the like.

For example, the memory 86 may store content transmitted from, and/or received by, other communication devices (e.g., electronic devices 100, 105, 110, 115, and 120). In this regard, in an exemplary embodiment, the memory 86 may store data received from various disparate sources.

Also for example, the memory 86 typically stores client applications (e.g., C++ applications, C++ projects, etc.), instructions, algorithms or the like for execution by the processor 70 to perform steps associated with operation of the communication device 145 in accordance with embodiments of the invention. As explained below, for example, the memory 86 may store one or more client applications such as for example software (e.g., software code also referred to herein as computer code).

The processor 70 may be embodied in a variety of ways. For instance, the processor 70 may be embodied as a controller, coprocessor, microprocessor of other processing devices including integrated circuits such as, for example, an application specific integrated circuit (ASIC), a field programmable gate array (FPGA). In an exemplary embodiment, the processor may execute instructions stored in the memory 86 or otherwise accessible to the processor 70.

The communication device 145 may include one or more logic elements for performing various functions of one or more client applications. In an exemplary embodiment, the communication device 145 may execute the client applications. The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the communication device is capable of communicating with other communication devices (e.g., electronic devices 100, 105, 110, 115, 120) over one or more networks (e.g., network 140) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

In addition to the communication interface(s), the interface(s) may also include at least one user interface that may include one or more earphones and/or speakers, a display 80, and/or a user input interface 82. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an exemplary embodiment, the processor 70 may be in communication with and may otherwise control a unity build module 78. The unity build module 78 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the unity build module 78, as described below. In examples in which software is employed, a device or circuitry (e.g., processor 70 in one example) executing the software forms the structure associated with such means. As such, for example, the unity build module 78 may be configured to, among other things, unite one or more source files (while excluding other source files from a project) and compile the source files into one or more object files. In this regard, the unity build module 78 may link the object file(s) to an executable or a link library such as for example, a dynamic link library (DLL). By uniting the source files and compiling the united source files to obtain an object file(s) that is linked to an executable or a link library, the unity build module 78 may reduce the project build time of an application such as, for example, a C++ application, as described more fully below.

Exemplary System Operation

Exemplary embodiments of the invention may provide an efficient and reliable mechanism for improving productivity and reducing build times developing software or applications. In this regard, the exemplary embodiments may reduce C++ project build times based in part on performing a unity build technique that may automate generation of unity source files. In this regard, the example embodiments may compile all source files into one or a few object files by referencing (e.g., via a designation such as #include) all source files in one or a few uniting source files while excluding other source files from the project. This may result in a significant reduction of disk reads since all required header files may be available from a translation unit during compilation. Also, the number of disk writes may significantly be reduced since the total number of object files is reduced (e.g., one or a few (e.g., 2-10 object files for a large project)). Additionally, link time may be significantly reduced since the number of object files (e.g., one or a few) in need of being read and parsed is minimized.

Referring now to FIG. 4, a diagram illustrating a unity build of an application according to an example embodiment is provided. In the example embodiment of FIG. 4, there are up to 820 CPP Files, for example, spanning CPP File 1 through CPP File 820. The CPP Files may reference one or more header files. For instance, CPP File 1 references H File 1, CPP File 2 references H File 2 and H File 841. Additionally, CPP File 820 references H File 3 and H File 841.

In the example embodiment of FIG. 4, in performing the unity build 9, the unity build module 78 may exclude individual CPP files from the build of the application. Instead, the unity build module 78 may include each of the CPP Files into one uniting file 7 (also referred to herein as Unity CPP File 7). The unity build module 78 may include (e.g., via a #include designation) CPP File 1, CPP File 2, through CPP File 821 in the Unity CPP File 7. As such, each of the CPP Files 1-820 may be included in this one Unity CPP File 7 and in response to receiving an indication to compile, the unity build module 78 may not necessarily read and parse header file H File 841 more than once (e.g., twice) since H File 841 is visible or detectable in the Unity CPP File 7.

In other words, the unity build module 78 may read and parse the respective header files (e.g., H File 1, H File 2, H File 3, H File 841) that corresponding CPP Files (e.g., CPP File 1, CPP File 2, CPP File 820) reference only once since CPP File 1 references H File 1, CPP File 2 references H File 2 and H File 841, and CPP File 820 references H File 3 and H File 841 in the Unity CPP File 7. In the example embodiment of FIG. 4, the unity build module 78 may compile the Unity CPP File 7, as opposed to each CPP File individually or separately, and as such the unity build module 78 may read each header file referred to in the Unity CPP File 7 once since each of the header files are detectable in the Unity CPP File 7 translation unit. As such, in this example embodiment, the unity build module 78 is not required to read H File 841 twice even though both CPP File 2 and CPP File 820 reference H File 841. Since H File 841 is visible or detectable by the unity build module 78 in the Unity CPP File 7, the unity build module 78 may only need to read and parse H File 841 once. In this regard, even though the unity build module 78 may detect H File 841 multiple times since H File 841 is referenced by CPP File 2 and CPP File 820, the unity build module 78 only needs to read H File 841 once.

In the example embodiment of FIG. 4, the unity build module 78 may generate an object file 5 (e.g., a single object file) in response to compiling the Unity CPP File 7. By generating a single object file 5, the unity build module 78 does not have to write multiple object files to disk (e.g., memory 86) which is faster than existing approaches. During a link time, the unity build module 78 may link the object file 5 to a link library (e.g., a DLL) or an executable 3 (e.g., a C++ application).

Since the unity build module 78 does not have to read and parse the same header file multiple times or write various object files multiple times to persistent memory (e.g., memory 86), the unity build module 78 may perform a build of an application (e.g., a C++ application) faster than existing approaches. As such, by performing the unity build technique, the unity build module 78 may reduce the number of disk reads and writes which may conserve processing and memory capacity. For instance, by utilizing the unity build technique, the unity build module 78 may build an application (e.g., a C++ application or project) in as low as 90 seconds whereas the current or existing approach may take over 40 minutes (e.g., 43 minutes) to build an application.

In an example embodiment, the unity build module 78 may implement a new build configuration (also referred to herein as unity build configuration) by enabling selection or designation of the cpp files to include and the cpp files to exclude from a unity file (e.g., Unity CPP File 7) of a build project of a user. In this new build configuration the unity build module 78 may, but need not, exclude all source files from being individually or separately built for a project (e.g., a C++ application) and may include the source files (e.g., cpp files) in a unity file such as for example a Unity CPP File (e.g., Unity CPP File 7). In some other example embodiments, the unity build module 78 may automatically generate a unity file that includes all source files for a designated project (e.g., a C++ application build project).

Referring now to FIG. 5, a diagram illustrating a user interface is provided according to an example embodiment. In the example embodiment of FIG. 5, the unity build module 78 may generate the user interface 11 (also referred to herein as unity build visual studio add-in interface 11). In the example embodiment of FIG. 5, the unity build module 78 may generate the user interface 11 to include one or more tabs, buttons or the like under the build menu 2. For instance, the build menu 2 may have a start minimal unity build button 4 (also referred to herein as minimal unity build button 4), a start full unity build button 8 (also referred to herein as full unity build button 8) and a unity build project settings button 6 among other suitable buttons. In response to receipt of an indication of the unity build project settings button 6, the unity build module 78 may adjust the manner in which one or more unity files (e.g., Unity CPP File 7) are set. For instance, response to receipt of an indication of the unity build project settings tab 6 may enable selection or adjustment of the number unity files to generate.

In response to receipt of an indication of a selection of the full unity build button 8, the unity build module 78 may perform a full unity build for a project (e.g., another software or application build (e.g., a C++ application build)). In this regard, the unity build module 78 may perform a full unity build in an instance in which a unity build is being performed for the first time or in an instance in which one or more new files (e.g., cpp files) are added to a project or one or more files are removed from a project. As an example, presume the unity build module 78 initially generated the unity build 9 of FIG. 4 in response to receipt of an indication of a selection of the full unity build button 8. In this regard, the unity build module 78 included each of the CPP Files (e.g., CPP Files 1-820) in the Unity CPP File 7 while performing the unity build 9 to build a software/application (e.g., executable 3).

As another example, in an instance in which one or more new files are added to a project (e.g., a software or application build), the unity build module 78 may include any new source files (e.g., new cpp files) in a unity file and the unity build module 78 may perform a full unity build that includes the new files for the software/application build (e.g., a C++ application).

On the other hand, in an instance in which a unity build is previously generated with a corresponding unity file (e.g., CPP Unity File 7) and the there are no source files added or removed from the unity file for a project (e.g., a C++ application build project), the unity build module 78 may perform a minimal unity build by utilizing the previously generated unity file since there are no source files that were added or removed from a project. For instance, since there were no source files added or removed from a corresponding project there may not be a need to perform a full unity build for the same project.

In some example embodiments, the unity build module 78 may dynamically generate a unity file(s) such that no user maintenance is required in an instance in which the user build module 78 operates in a unity build visual studio add-in mode. In this regard, for example, the unity build module 78 may dynamically generate a unity file referencing each of the source files (e.g., cpp files) initially designated for a corresponding project.

Additionally, in some example embodiments operation of the unity build module 78 in the unity build visual studio add-in mode may allow a user (e.g., a software developer) to continue working in a configuration (e.g., Debug or Release) such that the user may compile one file (e.g., a cpp file(s)) at a time even in an instance in which the unity build module 78 facilitates generation of a unity file that includes the source files for the project to be compiled for a unity build. In this regard, the unity build module 78 may enable a user to seamlessly switch between the unity build configuration in which unity file (e.g., Unity CPP File 7) that includes all source files for the project is compiled, to a configuration in which the individual files (e.g., cpp files) may be compiled one at a time.

In other example embodiments, in an instance in which the unity build module 78 is not operating in the unity build visual studio add-in mode, the unity build module 78 may not be able to compile individual source files (e.g., cpp files) of a project one file at a time, when the unity build module 78 is performing a unity build based in part on compiling a unity file (e.g., Unity CPP File 7). For instance, the unity build module 78 may not be able to compile the individual source files (e.g., cpp files) since the individual source files are excluded from the project and instead are included in a unity file. Instead, a user may have to make (e.g., manual) selections to trigger the unity build module 78 to exit from the unity build and switch to an original configuration that has the individual source files (e.g., cpp files) so that the source files may be compiled by the unity build module 78 one at a time. Switching from the unity build to the original configuration in this manner may be a multi-step process and may be time consuming which may, but need not, be undesirable to a user. As such, a user (e.g., a software developer) may desire to select that the unity build module 78 operates in the unity build visual studio add-in mode in an instance in which the user wants to seamlessly switch between performing a unity build based in part on compiling a unity file and another configuration to compile the source files of a project one at a time.

Additionally, in the unity build visual studio add-in mode, the unity build module 78 may allow execution of a full unity build or a minimal unity build in response to receipt of an indication of a selection of button (e.g., full unity build button 8, minimal unity build button 4) of the user interface 11, in the manner described above.

Referring now to FIG. 6, a flowchart for building an application is provided according to an exemplary embodiment. At operation 600, an apparatus (e.g., communication device 145) may generate a build of an application (e.g., a software build) in a C Object-Oriented Programming Language (C++). At operation 605, the apparatus (e.g., communication device 145) may generate a unity file (e.g., Unity CPP File 7) including a plurality of source files (e.g., CPP File 1, CPP File 2, CPP File 820) including references to one or more header files (e.g., H File 1, H File 2, H File 3, H File 841). At least two of the source files (e.g., CPP File 2, CPP File 820) may include references to a same header file (e.g., H File 841). At operation 610, the apparatus (e.g., communication device 145) may compile the unity file (e.g., Unity CPP File 7) including the plurality of source files to obtain/generate an object file (e.g., a single object file (e.g., object file 5)). At operation 615, the apparatus (e.g., communication device 145) may link the object file (e.g., object file 5) to generate an executable of the application (e.g., executable 3).

It should be pointed out that FIG. 6 is a flowchart of a system, method and computer program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86) and executed by a processor (e.g., processor 70, unity build module 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart blocks or steps.

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In an exemplary embodiment, an apparatus for performing the method of FIG. 6 above may comprise a processor (e.g., the processor 70, the unity build module 78) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 70 (e.g., as means for performing any of the operations described above), the unity build module 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   generating a build of an application in a C Object-Oriented Programming Language;
   generating a unity file including a plurality of source files comprising references to a plurality of header files, at least two of the source files comprise references to a same header file;
   in response to receiving an indication to compile, performing a single read of the same header file that the at least two of the source files make reference to into a memory device;
   compiling, via a processor, the unity file comprising the plurality of source files to obtain a single object file;
   based at least on the performing of the single read of the same header file, linking the single object file, obtained from compiling the unity file, to generate an executable of the application; and
   generating a second build of the application by utilizing the unity file based at least in part on determining that one or more new source files are not added to the unity file or that one or more source files of the plurality of source files are not removed from the unity file in response to receipt of an indication of a selection to generate a minimal unity build.

2. The method of claim 1, wherein compiling the unity file further comprises reading and parsing the header files referenced by respective source files once even though at least two source files comprise references to the same header file.

3. The method of claim 1, wherein generating the unity file further comprises excluding the source files from being separately compiled one at a time.

4. The method of claim 1, wherein:
   generating the unity file comprises automatically generating the unity file based in part on determining that the plurality of source files are designated for the build of the application; and
   the source files comprise C plus plus (C++) files.

5. The method of claim 1, further comprising:
   switching a configuration to enable compiling of one or more of the plurality of source files separately during the build of the application.

6. The method of claim 1, further comprising:
   generating another build of the application based in part on determining that one or more new source files are added to the unity file in response to receipt of an indication of a selection to generate a full unity build.

7. The method of claim 1, wherein the object file comprises references to each of the plurality of source files that comprise references to the header files.

8. An apparatus comprising at least one processor and at least one memory including computer program code, the at least one memory and the computer program code configured to, with the processor, cause the apparatus to at least:
   generate a build of an application in a C Object-Oriented Programming Language;
   generate a unity file including a plurality of source files comprising references to a plurality of header files, at least two of the source files comprise references to a same header file;
   in response to receiving an indication to compile, performing a single read of the same header file that the at least two of the source files make reference to into a memory device;
   compile the unity file comprising the plurality of source files to obtain a single object file;
   based at least on the performing of the single read of the same header file, link the single object file, obtained from compiling the unity file, to generate an executable of the application; and
   generate another build of the application by utilizing the unity file based at least in part on determining that one or more new source files are not added or added to the unity file or that one or more source files of the plurality of source files are not removed from the unity file in response to receipt of an indication of a selection to generate a minimal unity build.

9. The apparatus of claim 8, wherein the memory and computer program code are further configured to, with the processor, cause the apparatus to:

generate the unity file by excluding the source files from being separately compiled one at a time.

10. The apparatus of claim 8, wherein prior to the link of the object file, the memory and computer program code are further configured to, with the processor, cause the apparatus to:

write the object file once to a persistent memory.

11. The apparatus of claim 8, wherein the memory and computer program code are further configured to, with the processor, cause the apparatus to:

generate the unity file by automatically generating the unity file based in part on determining that the plurality of source files are designated for the build of the application, and wherein the source files comprise C plus plus (C++) files.

12. The apparatus of claim 8, wherein the memory and computer program code are further configured to, with the processor, cause the apparatus to:

switch a configuration to enable compiling of one or more of the plurality of source files separately during the build of the application based in part on the unity file.

13. The apparatus of claim 8, wherein the memory and computer program code are further configured to, with the processor, cause the apparatus to:

generate a third build of the application based in part on determining that one or more new source files are added to the unity file in response to receipt of an indication of a selection to generate a full unity build.

14. The apparatus of claim 8, wherein the object file comprises references to each of the plurality of source files that comprises references to the header files.

15. A computer program product comprising at least one non-transitory computer-readable storage medium having computer-readable program code portions stored therein, the computer-readable program code portions comprising:

program code instructions configured to generate a build of an application in a C Object-Oriented Programming Language;

program code instructions configured to generate a unity file including a plurality of source files comprising references to a plurality of header files, at least two of the source files comprise references to a same header file;

program code instructions configured to, in response to receiving an indication to compile, perform a single read of the same header file that the at least two of the source files make reference to into a memory device;

program code instructions configured to compile the unity file comprising the plurality of source files to obtain a single object file;

program code instructions configured to, based at least on the performing of the single read of the same header file, link the single object file, obtained from compiling the unity file, to generate an executable of the application; and generate another build of the application by utilizing the unity file based at least in part on determining that one or more new source files are not added to the unity file or that one or more source files of the plurality of source files are not removed from the unity file in response to receipt of an indication of a selection to generate a minimal unity build.

16. The computer program product of claim 15, further comprising:

program code instructions configured to compile the unity file based in part on reading and parsing the header files referenced by respective source files once even though the at least two source files comprise references to the same header file.

* * * * *